(12) United States Patent
Hirai et al.

(10) Patent No.: US 9,034,120 B2
(45) Date of Patent: *May 19, 2015

(54) BEARING STEEL BEING EXCELLENT BOTH IN WORKABILITY AFTER SPHEROIDIZING-ANNEALING AND IN HYDROGEN FATIGUE RESISTANCE PROPERTY AFTER QUENCHING AND TEMPERING

(75) Inventors: Yasumasa Hirai, Chiyoda-ku (JP); Kiyoshi Uwai, Chiyoda-ku (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/824,681

(22) PCT Filed: Nov. 29, 2011

(86) PCT No.: PCT/JP2011/006659
§ 371 (c)(1),
(2), (4) Date: Apr. 18, 2013

(87) PCT Pub. No.: WO2012/073488
PCT Pub. Date: Jun. 7, 2012

(65) Prior Publication Data
US 2013/0224065 A1    Aug. 29, 2013

(30) Foreign Application Priority Data

Nov. 29, 2010   (JP) .................................. 2010-265533
Feb. 25, 2011   (JP) .................................. 2011-040606

(51) Int. Cl.
*C22C 38/22*   (2006.01)
*C22C 38/60*   (2006.01)
(Continued)

(52) U.S. Cl.
CPC ................. *C22C 38/60* (2013.01); *C21D 6/002* (2013.01); *C21D 9/40* (2013.01); *C21D 1/32* (2013.01);
(Continued)

(58) Field of Classification Search
CPC ....................................................... C22C 38/22
USPC .......... 148/320, 330, 333–335; 420/105, 106, 420/108–110
See application file for complete search history.

(56) References Cited

U.S. PATENT DOCUMENTS 5,403,545 A    4/1995   Takata et al.
6,402,658 B1   6/2002   Yasuhara et al.
(Continued)

FOREIGN PATENT DOCUMENTS

CN   1129465 A   8/1996
CN   1211634 A   3/1999
(Continued)

OTHER PUBLICATIONS

Feb. 21, 2012 International Search Report issued in International Patent Application No. PCT/JP2011/006659.
(Continued)

*Primary Examiner* — Brian Walck
(74) *Attorney, Agent, or Firm* — Oliff PLC

(57) ABSTRACT

Provided is bearing steel excellent in workability after spheroidizing-annealing and in hydrogen fatigue resistance property after quenching and tempering. The bearing steel has a chemical composition containing, by mass %: 0.85% to 1.10% C; 0.30% to 0.80% Si; 0.90% to 2.00% Mn; 0.025% or less P; 0.02% or less S; 0.05% or less Al; 1.8% to 2.5% Cr; 0.15% to 0.4% Mo; 0.0080% or less N; and 0.0020% or less O, which further contains more than 0.0015% to 0.0050% or less Sb, with the balance being Fe and incidental impurities, to thereby effectively suppress the generation of WEA even in environment where hydrogen penetrates into the steel, so as to improve the roiling contact fatigue life and also the workability such as cuttability and forgeability of the material.

2 Claims, 4 Drawing Sheets

(51) Int. Cl.

| | | |
|---|---|---|
| *C21D 6/00* | (2006.01) | |
| *C21D 9/40* | (2006.01) | |
| *C21D 1/32* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/28* | (2006.01) | |
| *C22C 38/32* | (2006.01) | |
| *C22C 38/38* | (2006.01) | |
| *C22C 38/44* | (2006.01) | |
| *C22C 38/58* | (2006.01) | |
| *F16C 33/62* | (2006.01) | |

(52) U.S. Cl.
CPC .............. *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *F16C 33/62* (2013.01); *C22C 38/20* (2013.01); *C22C 38/28* (2013.01); *C22C 38/32* (2013.01); *C22C 38/38* (2013.01); *C22C 38/44* (2013.01); *C22C 38/58* (2013.01)

(56) References Cited

U.S. PATENT DOCUMENTS

| | | | |
|---|---|---|---|
| 6,423,158 B1 | 7/2002 | Maeda et al. | |
| 2006/0081314 A1* | 4/2006 | Iwamoto et al. | ............. 148/659 |

FOREIGN PATENT DOCUMENTS

| | | |
|---|---|---|
| CN | 1251622 A | 4/2000 |
| CN | 1745188 A | 3/2006 |
| CN | 1774521 A | 5/2006 |
| CN | 101186995 A | 5/2008 |
| EP | 1355071 A1 | 10/2003 |
| EP | 1595966 A1 | 11/2005 |
| EP | 1 614 761 A1 | 1/2006 |
| EP | 1614761 A1 | 1/2006 |
| JP | 55440226 | 3/1979 |
| JP | 55739163 | 3/1982 |
| JP | S62247055 | 11/1987 |
| JP | S63255345 A | 10/1988 |
| JP | A-3-254342 | 11/1991 |
| JP | H03-254339 A | 11/1991 |
| JP | A-5-255809 | 10/1993 |
| JP | A-7-316730 | 12/1995 |
| JP | A-8-311615 | 11/1996 |
| JP | 2000-204445 A | 7/2000 |
| JP | 2000204445 * | 7/2000 .............. C21D 6/00 |
| JP | 2000234128 A | 8/2000 |
| JP | 2002060904 A | 2/2002 |
| JP | A-2002-60904 | 2/2002 |
| JP | 2002332542 A | 11/2002 |
| JP | 2004124215 A | 4/2004 |
| JP | A-2006-45629 | 2/2006 |
| JP | 2006213981 A | 8/2006 |
| JP | 2007262449 A | 10/2007 |
| JP | A-2007-262449 | 10/2007 |
| JP | A-2008-88478 | 4/2008 |
| JP | 2008255399 A | 10/2008 |
| JP | A-2008-255399 | 10/2008 |
| JP | A-2009-242920 | 10/2009 |
| JP | 2010236049 A | 10/2010 |
| JP | 2010255095 A | 11/2010 |
| KR | A-10-2005-0122222 | 12/2005 |

OTHER PUBLICATIONS

Dec. 17, 2013 Extended European Search Report issued in European Patent Application No. 11844108.8.
Jun. 4, 2013 International Preliminary Report on Patentability issued in International Application No. PCT/JP2011/006659.
Jun. 16, 2014 Office Action issued in Chinese Patent Application No. 201180052676.X (with English translation).
Sep. 20, 2014 Notice of Reasons for Rejection issued in Korean Patent Application No. 10-2013-7012081 (with English Translation).
Sep. 2, 2013 Office Action issued in Korean Application No. 10-2013-7009490.
Jun. 4, 2013 International Preliminary Report on Patentability issued in International Application No. PCT/JP2011/006545.
Feb. 14, 2012 International Search Report issued in International Application No. PCT/JP2011/006545.
Jan. 2, 2014 Office Action issued in Korean Patent Application No. 10-2013-7009490.
Jan. 6, 2014 Chinese Office Action issued in Chinese Patent Application No. 201180052654.3.
Mar. 31, 2014 Supplementary European Search Report issued in EP 11 84 5154.
Jul. 10, 2014 Office Action issued in Korean Patent Application No. 2013-7009490.

* cited by examiner

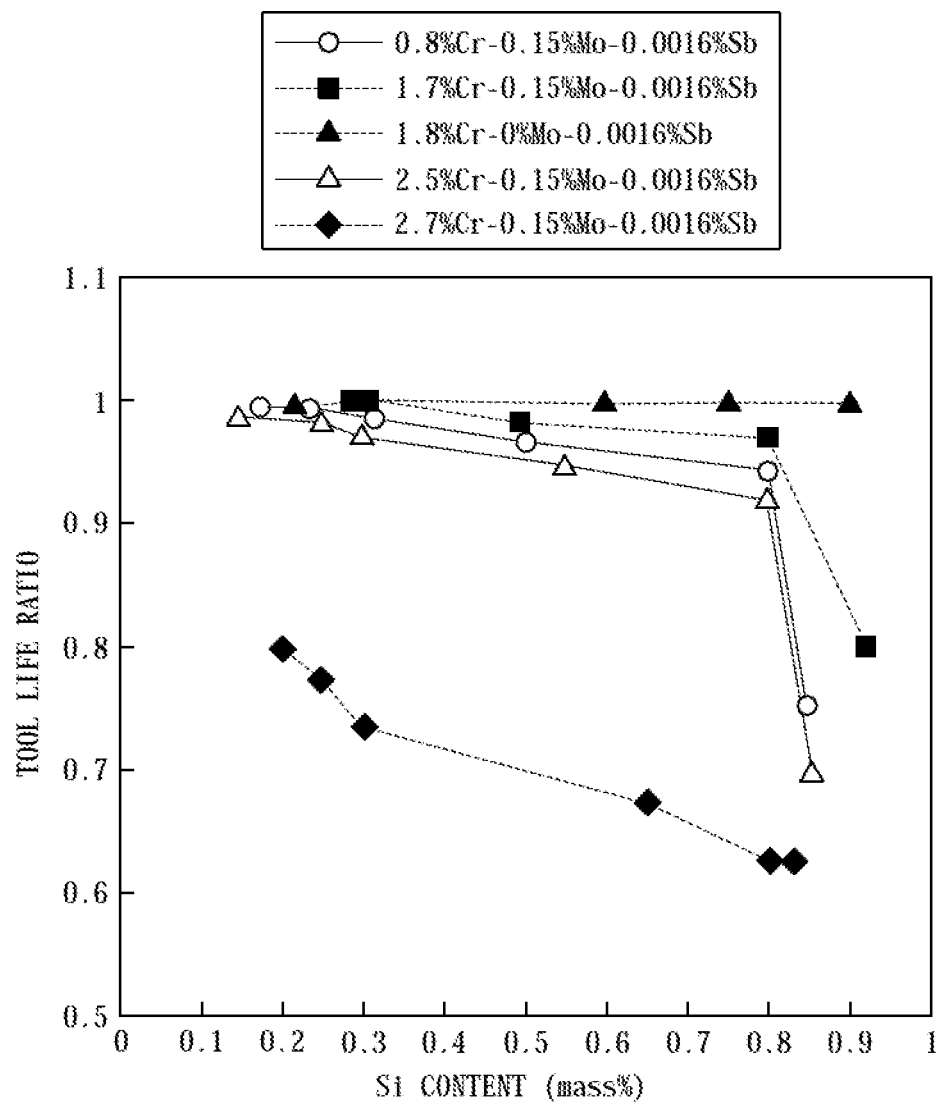

BEARING STEEL BEING EXCELLENT BOTH IN WORKABILITY AFTER SPHEROIDIZING-ANNEALING AND IN HYDROGEN FATIGUE RESISTANCE PROPERTY AFTER QUENCHING AND TEMPERING

TECHNICAL FIELD

The present invention relates to bearing steel capable of suppressing bearing damage ascribable to white structure resulting from hydrogen, which has been a problem in bearing steel made by conventional bearing steel (JIS-SUJ2) for use in, for example, automobiles, windmills, and industrial machines, and further, the alloy contents in the bearing steel are suppressed so as to impart workability equivalent to that of JIS-SUJ2, to thereby provide bearing steel being excellent both in workability after spheroidizing-annealing and in hydrogen fatigue resistance property after quenching and tempering.

BACKGROUND ART

A bearing is required to have an excellent rolling contact fatigue life, and in recent years, there has been a problem of shortened rolling contact fatigue life of a bearing made of conventional bearing steel (JIS-SUJ2) for use in, for example, automobiles, windmills, and industrial machine. In view of this, various studies have been made on the improvement of rolling contact fatigue life. An example of the bearing member includes a bearing for use as an alternator of an automobile.

It has already been known that the rolling contact fatigue fracture, which determines the rolling contact fatigue life of a bearing, is caused by microstructural change called white structure generated right on the rolling contact orbit of the bearing, resulting in a crack generated and extended in the bearing.

Here, the aforementioned white structure is categorized into the following three types:

(1) white structure (hereinafter, also referred to as WEA), which is randomly generated without having any specific orientation relationship relative to the rolling contact orbit;

(2) white structure (butterfly), which is generated on the periphery of a non-metal inclusion in a direction at 45°; and (3) white structure (white band), which has orientations of about 80° and about 30° relative to the rolling contact orbit.

In particular, the generation of WEA leads to a bearing fatigue fracture in a shorter time before reaching expected rating life of the bearing, and thus WEA should be most urgently dealt with.

The WEA is considered to be generated, as described in Patent Literature 1 (PTL 1), through the following mechanism. That is, a lubricant such as grease or a lubricant oil used in the bearing and water penetrating into the bearing are decomposed through a tribochemical reaction to generate hydrogen, and the hydrogen thus generated penetrates into the steel and is accumulated therein so as to accelerate the generation of WEA.

As examples of measures to be taken to suppress the generation of WEA, Patent Literature 2 (PTL 2) discloses a method of increasing Cr content and N content to thereby increase the amount of retained austenite, and Patent Literature 3 (PTL 3) discloses a method of adding Ni alone or of simultaneously adding Ni and Mo together.

CITATION LIST

Patent Literature

PTL 1: JP 2008-255399 A
PTL 2: JP 2007-262449 A
PTL 3: JP 2002-60904 A

SUMMARY OF INVENTION

Technical Problem

Meanwhile, in the manufacture of a bearing, a bearing steel material needs to be subjected to cutting work or the like. For this reason, the bearing steel is required to be capable of suppressing the generation of WEA and also to have an excellent workability in, for example, post spheroidizing-annealing cutting work.

However, the aforementioned disclosures of PTL 1 to PTL 3 give no consideration or merely give general consideration to the workability in, for example, cutting work of the bearing steel.

The present invention has been made in view of the aforementioned circumstances, and has an object of providing bearing steel in which the generation of WEA is effectively suppressed so as to improve not only the rolling contact fatigue life even in environment where hydrogen penetrates into the steel from a lubricant oil or the like but also the workability such as cuttability and forgeability of the material, to thereby provide bearing steel being excellent both in workability after spheroidizing-annealing and in hydrogen fatigue resistance property after quenching and tempering.

Solution to Problem

The inventors of the present invention have made an extensive study to develop a steel material that has cuttability equivalent to that of conventional steel such as JIS-SUJ2, and has more excellent hydrogen fatigue resistance than JIS-SUJ2.

In the following description, the content of each element contained in steel, which is merely represented by %, all refers to mass %.

First, steel samples which were varied in contents of Si, Cr, and Mo and charged with hydrogen were subjected to investigation of a rolling contact fatigue life $B_{10}$. A base steel material contained 0.9% C, 1% Mn, 0.016% P, 0.008% S, 0.025% Al, 0.003% N, and 0.0015% O.

For comparison, a steel sample equivalent to conventional JIS-SUJ2 steel (containing: 1.05% C; 0.25% Si; 0.45% Mn; 0.016% P; 0.008% S; 0.025% Al; 1.45% Cr; 0.003% N; and 0.0010% O) was also subjected to investigation of the rolling contact fatigue life $B_{10}$. The test pieces were prepared and subjected to rolling fatigue test under the same conditions as those illustrated in Examples to be described later.

The value of the rolling contact fatigue life $B_{10}$ obtained for each steel sample was divided by the value of the rolling contact fatigue life $B_{10}$ obtained for steel equivalent to JIS-SUJ2, to thereby evaluate the improvement of life relative to the conventional steel ($B_{10}$ Life Ratio=Life $B_{10}$/Life $B_{10}$ of Steel equivalent to JIS-SUJ2).

FIG. 1 shows the results thereof in order, with Si content on the abscissa and $B_{10}$ Life Ratio on the ordinate.

As is apparent from FIG. 1, the $B_{10}$ life ratio was improved 4 times or more when Si content is 0.3% or more in steel containing Cr by 1.8% or more and Mo by 0.15%. In contrast, the $B_{10}$ life hardly increased in steel containing Cr by 1.7% even if Mo was contained by 0.15% and Si was contained by 0.3% or more. Further, even in steel containing Cr by 1.8% or more, the $B_{10}$ life was not improved when Mo content was 0%, even if Si was contained to 0.3% or more.

Further, WEA was observed in a structure of an exfoliated portion of each test piece that has reached its rolling contact fatigue life, and it was identified that all the exfoliation was ascribable to WEA.

It was found from the above that steel containing Cr by 1.8% or more, Si by 0.3% or more, and Mo by 0.15% or more is capable of delaying the development of WEA, to thereby improve the rolling contact fatigue life thereof.

Next, each steel that had been investigated for the rolling contact fatigue life as described above was subjected to outer periphery turning test, to thereby investigate the machinability thereof. The test was performed under the same conditions as those illustrated in Examples to be described later, and measured was the time that elapsed before the tool reached the flank wear (hereinafter, referred to as tool life) of 0.2 mm. The machinability can be defined as excellent when the time is long. The tool life obtained for each steel was divided by the tool life for steel equivalent to JIS-SUJ2, to thereby evaluate the improvement of the tool life relative to conventional steel (Tool Life Ratio=Tool Life/Tool Life of Steel equivalent to JIS-SUJ2).

FIG. 2 shows the results thereof in order, with Si content on the abscissa and Tool Life Ratio on the ordinate.

As shown in FIG. 2, the 1.8% Cr-0.15% Mo steel and the 2.5% Cr-0.15% Mo steel, which were high in value of the rolling contact fatigue life $B_{10}$, showed a steep decline in tool life when Si content exceeded 0.8%. The 2.7% Cr-0.15% Mo steel was low in value of the tool life irrespective of the Si content.

It was found from the above that Mo-containing steel with Cr content of 2.5% or less and Si content of 0.8% or less was capable of ensuring machinability equivalent to that of the conventional JIS-SUJ2 steel.

In addition, the inventors also obtained the findings that Sb may further be added to steel in which the contents of Si, Cr, and Mo were adjusted to improve the rolling contact fatigue life, to thereby further improve rolling contact fatigue life without impairing machinability.

The above findings were obtained from a test which is described in below.

FIGS. 3 and 4 show, similarly to FIGS. 1 and 2, the results of the test performed for steel samples in which the contents of Si, Cr, and Mo were adjusted, with the base steel containing: 0.9% C; 1% Mn; 0.016% P; 0.008% S; 0.025% Al; 0.003% N; 0.0015% O; and 0.0016% Sb. Specifically, FIGS. 3 and 4 are graphs showing the results in order based on the relation between the Si content and the $B_{10}$ life ratio and the relation between the Si content and the tool life ratio.

As shown in FIG. 3, steel containing Cr by 1.8% or more, Si by 0.3% or more, and Mo by 0.15% or more may further contain Sb by 0.0016%, which can delay the development of WEA, to thereby improve the rolling contact fatigue life.

Further, as is apparent from FIG. 4, Mo-containing steel with Cr content of 2.5% or less and Si content of 0.8% or less may further contain Sb so as to ensure machinability equivalent to that of the conventional JIS-SUJ2 steel. Here, the $B_{10}$ life can be improved by a wider margin when Sb is added to steel containing Cr by 1.8% or more, Si by 0.3% or more, and Mo by 0.15% or more, as compared to a case where Sb is not added.

The present invention has been made based on the aforementioned findings, which has been completed in light of the results of investigation made on the Mo content capable of ensuring machinability, the rolling contact fatigue life obtained when hydrogen penetrates into the steel, and the influence of other chemical compositions on the machinability.

That is, the gist of the present invention is as follows.

1. Bearing steel having a chemical composition containing, by mass %:

C: 0.85% to 1.10%;
Si: 0.30% to 0.80%;
Mn: 0.90% to 2.00%;
P: 0.025% or less;
S: 0.02% or less;
Al: 0.05% or less;
Cr: 1.8% to 2.5%;
Mo: 0.15% to 0.4%;
N: 0.0080% or less; and
O: 0.0020% or less,
in which the chemical composition further contains, by mass %:
Sb: more than 0.0015% to 0.0050% or less,
with the balance being Fe and incidental impurities.

2. The bearing steel according to item 1, in which the chemical composition further contains, by mass %, at least one element selected from:

Ti: 0.01% or less;
Ni: 0.10% or less;
Cu: 0.10% or less; and
B: 0.0010% or less.

Advantageous Effect of Invention

According to the present invention, there may be obtained bearing steel that is not only excellent in workability in, for example, cutting work but also significantly improved in hydrogen fatigue resistance property as compared to conventional bearing steel, to thereby contribute to improving the rolling contact fatigue life of the bearing, which provides industrial beneficial effects.

BRIEF DESCRIPTION OF DRAWINGS

The present invention will be further described below with reference to the accompanying drawings, wherein:

FIG. 4 is a graph showing how the tool life is influenced by the contents of Si, Cr, and Mo, with the addition of Sb.

DESCRIPTION OF EMBODIMENTS

Figure 1:
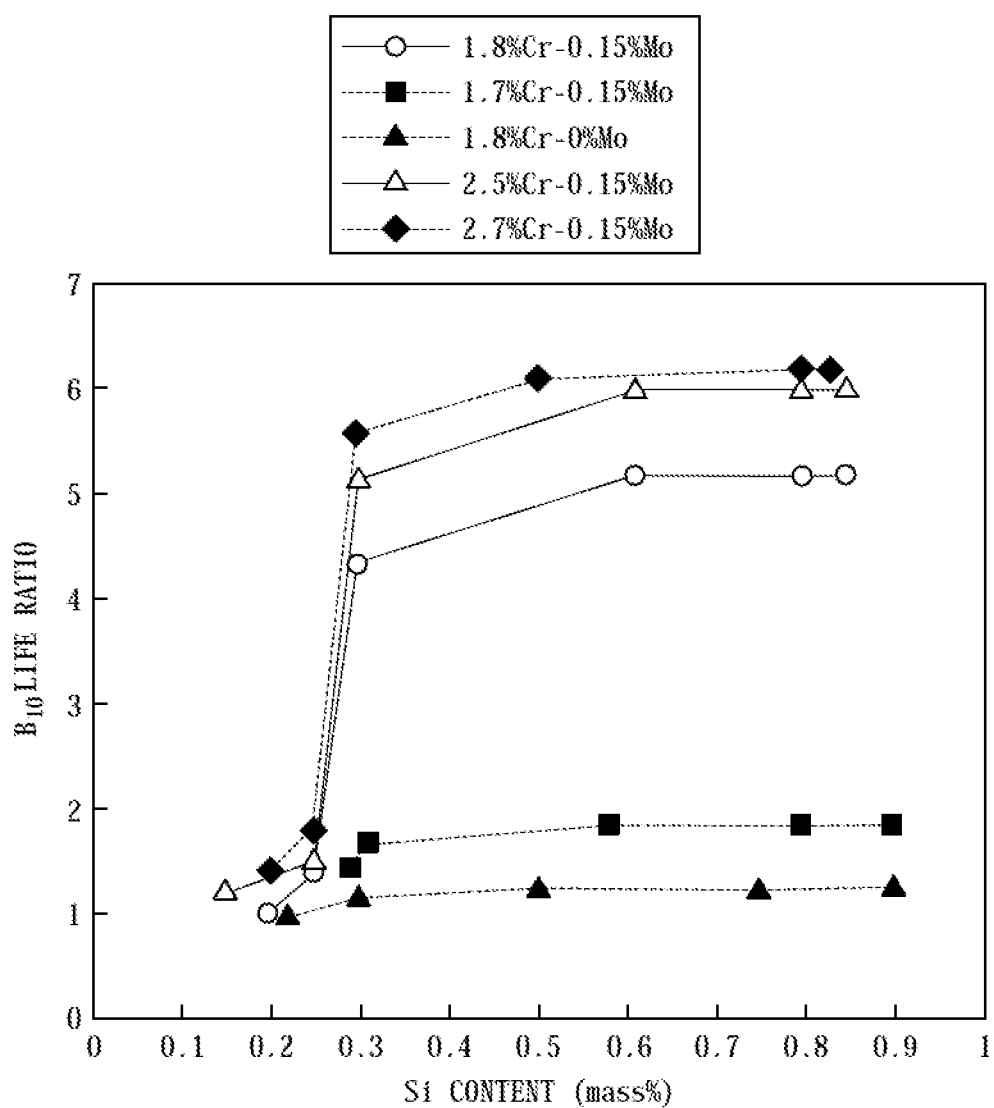
FIG. 1 is a graph showing how the rolling contact fatigue life $B_{10}$ is influenced by the contents of Si, Cr, and Mo.
Figure 2:
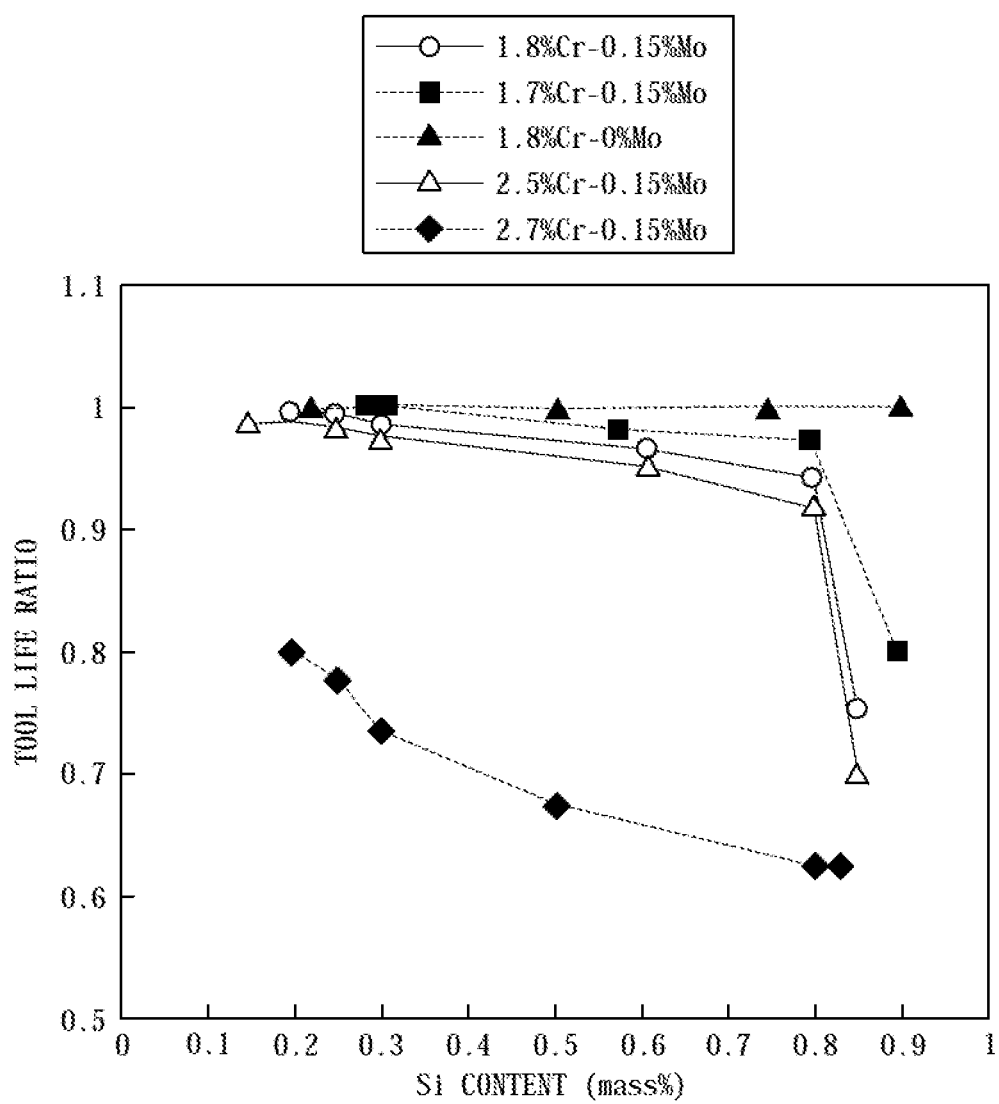
FIG. 2 is a graph showing how the tool life is influenced by the contents of Si, Cr, and Mo.
Figure 3:
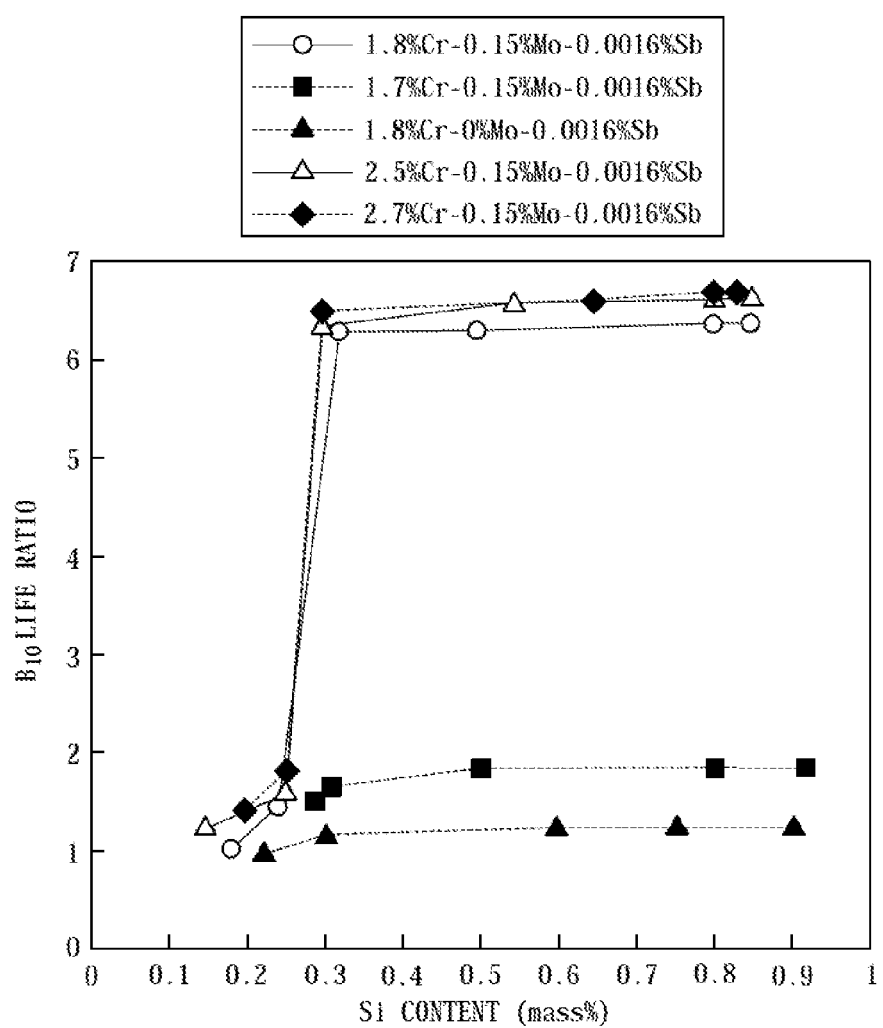
FIG. 3 is a graph showing how the rolling contact fatigue life $B_{10}$ is influenced by the contents of Si, Cr, and Mo, with the addition of Sb.

First, the reasons for restricting the content of each chemical composition of the bearing steel of the present invention to the following ranges are described. In the following, the content (%) of each composition is mass %.

$$0.85\% \leq C \leq 1.10\%$$

Carbon (C) is an element needed for ensuring hardness after quenching and tempering to maintain excellent rolling contact fatigue life of the bearing, and thus C needs to be contained by at least 0.85%. On the other hand, C content over 1.10% causes coarse carbide to remain, which rather causes deterioration in rolling contact fatigue life. Therefore, the C content is defined to be in a range of 0.85% to 1.10%.

0.30%≤Si≤0.80%

Silicon (Si) is a particularly important element in the present invention in order to improve hydrogen fatigue resistance property, which is an important element for ensuring the rolling contact fatigue life when hydrogen penetrates into the steel. As described above. Si content of less than 0.30% fails to develop the effect. On the other hand. Si content of more than 0.80% deteriorates machinability as described above. Accordingly, Si content is defined to fall within a range of 0.30% to 0.80%, and more preferably, the lower limit may be 0.40%.

0.90%≤Mn≤2.00%

Manganese (Mn) is necessary for ensuring hardness after quenching and tempering to maintain at high level the rolling contact fatigue life of the bearing steel. For this purpose, Mn needs to be contained at least 0.90%. However, Mn content over 2.00% impairs machinability. Therefore, Mn content is defined to fall within a range of 0.90% to 2.00%, and preferably within a range of 0.90% to 1.35%. Mn content may be in a range of 0.90% to 1.15%.

P≤0.025%

Phosphorus (P) causes segregation at the grain boundaries of austenite to reduce the grain boundary strength, which leads to the generation of a quench crack during quenching. Therefore, P content is preferably reduced to minimum, whereas allowed up to 0.025%. Preferably, P content is 0.020% or less. P is industrially contained by more than 0%, but P content may be 0% if possible.

S≤0.02%

Sulfur (S), which is added to form manganese sulfide (MnS) in the steel so as to improve cult ability, acts as a fracture origin in rolling contact if the content exceeds 0.02%, resulting in a reduction in rolling contact fatigue strength, and thus S content is 0.02% or less. S content is more preferably 0.01% or less. The aforementioned effect obtained through the formation of MnS can be obtained as long as S is contained at least 0.0003%.

Al≤0.05%

Aluminum (Al), which is an element effectively utilized for deoxidizing, is thus useful in producing ultra low oxygen steel. However, an aluminum oxide in the steel deteriorates rolling contact fatigue property, and therefore Al content is 0.05% or less in the present invention. Al content that remains after deoxidization can be suppressed to about 0.004% at minimum.

1.8%≤Cr≤2.5%

Chromium (Cr) is effective in suppressing the generation of white structure (WEA), and thus an important element in the present invention. The reason is as follows. That is, Cr content below 1.8% does not have much effect of improving the rolling contact fatigue life by suppressing the generation of white structure in hydrogen atmosphere, whereas Cr content of more than 2.5% leads to an increase in cost while significantly deteriorating machinability. Therefore, according to the present invention, Cr content is defined to fall within a range of 1.8% to 2.5%.

0.15%≤Mo≤0.4%

Molybdenum (Mo) is effective in suppressing the generation of white structure (WEA), and thus an important element in the present invention. Here, Mo content of less than 0.15% does not have much effect of improving the rolling contact fatigue life in hydrogen atmosphere, whereas Mo content of more than 0.4% leads to an increase in cost while significantly deteriorating machinability. Therefore, according to the present invention. Mo content is defined to fall within a range of 0.15% to 0.4%.

0.0015%<Sb≤0.0050%

Antimony (Sb) functions as a hydrogen trap site, and thus effective in suppressing the generation of white structure. Sb content of 0.0015% or less does not produce much effect, and therefore Sb content needs to be more than 0.0015%. On the other hand, Sb content over 0.0050% saturates the effect, and therefore Sb content is defined to fall within a range of more than 0.0015% to 0.0050% or less.

N≤0.0080%

Nitrogen (N) forms a bond to Al and Ti, to thereby form a nitride or a carbonitride, which produces an effect of suppressing the growth of austenite during heating for quenching. On the other hand, however, a coarse nitride or carbonitride causes deterioration in rolling contact fatigue life. Accordingly, in the present invention, N content is suppressed to 0.0080% or less, and preferably 0.0060% or less. The aforementioned effect produced by the formation of a nitride or a carbonitride can be obtained as long as N content is at least 0.0015%.

O≤0.0020%

Oxygen (O) can be found as a hard oxide-based non-metal inclusion, and the oxide-based non-metal inclusion is coarsened along with the increase in the amount of O content. The coarsened inclusion particularly affects the rolling contact fatigue property, and therefore, O content is desirably reduced to minimum. Accordingly, O content needs to be reduced to at least 0.0020% or less, preferably 0.0010% or less. O is industrially contained by more than 0%, but O content may be 0% if possible.

In addition to the basic compositions described in the above, the present invention allows one or two or more of the following compositions to be added as appropriate, in addition to the aforementioned basic compositions.

Ti≤0.01%

Titanium (Ti) may preferably be added because Ti forms a bond to nitrogen in the steel to form TiN, which produces the pinning effect in the austenite region to suppress grain growth. However, excessive amount of Ti results in a large amount of TiN precipitates, which deteriorates rolling contact fatigue life, and thus Ti content is suppressed to 0.01% or less. To obtain the aforementioned effect, Ti content may preferably be at least 0.003%.

Ni≤0.10%

Nickel (Ni) is an element for improving quench hardenability, and thus can be used for controlling quench hardenability. However, Ni is added up to 0.10%, because Ni is an expensive element and raises steel material price when added excessively. To obtain the aforementioned effect, Ni content is preferably at least 0.03%.

Cu≤0.10%

Copper (Cu) may be added for improving quench hardenability, but allowed only up to 0.10% because Cu content over 0.10% is likely to hinder hot workability. To obtain the aforementioned effect, Cu content is preferably at least 0.03%.

B≤0.0010%

Boron (B) has an effect of improving quench hardenability, and thus can be used for controlling quench hardenability. However, B content over 0.0010% saturates the effect, and thus may be added up to 0.0010%. To obtain the aforementioned effect, B content is preferably at least 0.0003%.

The balance other than the aforementioned compositions are Fe and incidental impurities penetrating in the process of manufacture.

The bearing steel with the aforementioned chemical compositions can be manufactured by a known method.

Specifically, steel prepared by steel making in a converter, a degassing system, or the like is casted to obtain a cast steel piece, which is subjected to diffusion annealing, rolling, or forging formation process, to thereby make a steel material of predetermined dimension. The steel material is subjected to conventionally-known spheroidizing annealing, so as to serve as a material to be processed into a bearing member. Thereafter, the material is subjected to working process such as cutting work and forging, to thereby obtain the bearing steel of the present invention.

Manufacturing conditions particularly preferred are exemplified as follows.

The spheroidizing annealing may preferably be performed by maintaining the steel at a temperature in a range of 750° C. to 820° C. for 4 hours to 16 hours, and then gradually cooling the steel to about 650° C. at a rate of about 8° C./h to 20° C./h. The microstructure of the material for processing that has been subjected to spheroidization annealing may preferably include ferrite and spheroidal cementite. and has Vickers hardness of preferably about 180 to 250.

The material for processing is processed to be in the shape of a bearing member, which is then subjected to quench hardening and tempering, so as to be obtained as a bearing member. If necessary, the material may be subjected to quench hardening and tempering before being processed in a member shape of final accuracy.

The quench hardening may preferably performed by retaining the steel at 800° C. to 950° C. for about 15 minutes to 120 minutes, and then subjecting the steel to quenching such as oil quenching or water quenching. The tempering may preferably be performed at a temperature in a range of 150° C. to 250° C. for about 30 minutes to 180 minutes. The bearing steel (bearing member) after quenching and tempering preferably contains tempered martensite into the inside thereof by about 90% or more in area ratio. Further, the steel preferably is preferably configured to have Vickers hardness of 700 to 800.

EXAMPLES

Example 1

Steel ingots (100 kg) having chemical compositions shown in Table 1 and Table 2 (with the balance being Fe and incidental impurities) were each subjected to vacuum smelting, and then to diffusion annealing at 1,250° C. for 30 hours, before being subjected to extend forging to be formed into a round bar of 60 mm in diameter. Then, the round bar was subjected to normalizing at 990° C. for 2 hours, and then subjected to spheroidizing annealing in which the round bar was retained at 785° C. for 10 hours and gradually cooled at a rate of 15° C./h.

A fatigue test piece of 60 mm in diameter and 5.5 mm in thickness was roughly processed from the round bar steel that had been subjected to spheroidizing annealing. The roughly-processed test piece thus obtained was first retained at 840° C. for 30 minutes, which was then oil-quenched and further subjected to tempering at 180° C. for two hours. The roughly-processed test piece thus tempered was finish processed into a test piece of 60 mm in diameter and 5.0 mm in thickness. The test piece thus finish-processed was charged with hydrogen. To charge hydrogen, the test piece was held in a 20% ammonium thiocyanate ($NH_4SCN$) aqueous solution of 50° C. for 24 hours. The hydrogen amounts were measured at temperatures up to 600° C. through thermal desorption analysis of hydrogen, to thereby confirm that the aforementioned condition allows hydrogen of 0.5 mass ppm to penetrate into conventional JIS-SUJ2 steel (No. 1 steel in Table 1).

Each test piece thus obtained was subjected to rolling contact fatigue test using a thrust type rolling contact fatigue tester. The test was performed within 30 minutes after hydrogen was charged as described above so as to simulate the use in a hydrogen environment. The rolling contact fatigue test was performed under the conditions where: Hertz stress was 3.8 GPa; stress loading late was 3,600 cpm, and turbine oil (FBK turbine #68, manufactured by JX Nippon Oil & Energy Corporation) was used for lubrication (at room temperature). The test was carried out 10 times for each steel type, and the resulting data was Weibull plotted, to thereby obtain $B_{10}$ life at which cumulative failure probability becomes 10%.

The rolling contact fatigue life $B_{10}$ obtained for each steel was divided by the value of the rolling contact fatigue life $B_{10}$ obtained for steel equivalent to JIS-SUJ2, to thereby obtain and evaluate the improvement of life relative to conventional steel ($B_{10}$ Life Ratio=$B_{10}$ Life/$B_{10}$ Life of Steel equivalent to JIS-SUJ2).

Next, each steel that had been subjected to spheroidizing annealing was tested for tool life (outer periphery turning test). The test was performed under the following conditions.
Cutting Speed: 120 m/min (without a lubricant)
Feed Rate: 0.2 mm/rev
Cut Depth: 1.0 mm
Tool Grade: equivalent to P10 cemented carbide
Under the above cutting conditions, the time that elapsed before the cutting tool reached the flank wear of 0.2 mm was measured as the tool life. The tool life obtained for each steel was divided by the tool life obtained for steel equivalent to JIS-SUJ2, to thereby obtain and evaluate the improvement of the tool life relative to conventional steel (Tool Life Ratio=Tool Life/Tool Life of Steel equivalent to JIS-SUJ2).

The obtained results are shown in both Tables 1 and 2.

TABLE 1

| Steel Sample No. | Chemical Composition (mass %) | | | | | | | | | | | $B_{10}$ Life Ratio*1 | Tool Life Ratio*2 | Remarks |
| --- | --- | --- | --- | --- | --- | --- | --- | --- | --- | --- | --- | --- | --- | --- |
| | C | Si | Mn | P | S | Al | Cr | Mo | N | O | Others | | | |
| 1 | 1.05 | 0.25 | 0.45 | 0.016 | 0.008 | 0.025 | 1.45 | — | 0.0031 | 0.0010 | — | 1.00 | 1.00 | Comparative Example |
| 2 | 0.91 | 0.35 | 1.05 | 0.016 | 0.008 | 0.025 | 2.00 | 0.23 | 0.0030 | 0.0015 | — | 5.17 | 1.00 | Comparative Example |
| 3 | 0.90 | 0.25 | 0.99 | 0.016 | 0.008 | 0.025 | 1.80 | 0.15 | 0.0040 | 0.0015 | — | 1.41 | 0.99 | Comparative Example |
| 4 | 0.91 | 0.61 | 0.98 | 0.016 | 0.009 | 0.024 | 1.80 | 0.15 | 0.0040 | 0.0015 | — | 5.17 | 0.97 | Comparative Example |

TABLE 1-continued

| Steel Sample No. | \multicolumn{11}{c}{Chemical Composition (mass %)} | $B_{10}$ Life Ratio*1 | Tool Life Ratio*2 | Remarks |
|---|---|---|---|---|---|---|---|---|---|---|---|---|---|---|
| | C | Si | Mn | P | S | Al | Cr | Mo | N | O | Others | | | |
| 5 | 0.89 | 0.80 | 1.01 | 0.016 | 0.010 | 0.025 | 1.82 | 0.15 | 0.0030 | 0.0015 | — | 5.17 | 0.94 | Comparative Example |
| 6 | 0.90 | 0.85 | 1.02 | 0.016 | 0.009 | 0.025 | 1.80 | 0.15 | 0.0030 | 0.0015 | — | 5.17 | 0.75 | Comparative Example |
| 7 | 0.92 | 0.31 | 0.99 | 0.016 | 0.008 | 0.024 | 1.72 | 0.15 | 0.0030 | 0.0015 | — | 1.67 | 1.00 | Comparative Example |
| 8 | 0.89 | 0.80 | 0.98 | 0.016 | 0.008 | 0.025 | 1.72 | 0.15 | 0.0035 | 0.0015 | — | 1.81 | 0.97 | Comparative Example |
| 9 | 0.92 | 0.30 | 1.00 | 0.016 | 0.009 | 0.025 | 1.80 | 0.14 | 0.0034 | 0.0015 | — | 1.17 | 1.00 | Comparative Example |
| 10 | 0.94 | 0.75 | 1.03 | 0.016 | 0.008 | 0.026 | 1.80 | 0.14 | 0.0040 | 0.0015 | — | 1.23 | 1.00 | Comparative Example |
| 11 | 0.91 | 0.78 | 0.96 | 0.016 | 0.008 | 0.025 | 2.50 | 0.14 | 0.0035 | 0.0015 | — | 2.00 | 0.95 | Comparative Example |
| 12 | 0.91 | 0.24 | 0.98 | 0.016 | 0.009 | 0.025 | 2.50 | 0.15 | 0.0035 | 0.0015 | — | 1.58 | 0.99 | Comparative Example |
| 13 | 0.87 | 0.30 | 1.00 | 0.016 | 0.007 | 0.025 | 2.50 | 0.15 | 0.0037 | 0.0015 | — | 5.17 | 0.98 | Comparative Example |
| 14 | 0.90 | 0.80 | 1.01 | 0.016 | 0.008 | 0.025 | 2.50 | 0.15 | 0.0036 | 0.0015 | — | 6.00 | 0.92 | Comparative Example |
| 15 | 0.88 | 0.85 | 1.04 | 0.016 | 0.009 | 0.025 | 2.50 | 0.15 | 0.0034 | 0.0015 | — | 6.00 | 0.70 | Comparative Example |
| 16 | 0.93 | 0.25 | 1.03 | 0.016 | 0.010 | 0.025 | 2.70 | 0.15 | 0.0031 | 0.0015 | — | 1.83 | 0.78 | Comparative Example |
| 17 | 0.92 | 0.50 | 0.99 | 0.016 | 0.009 | 0.025 | 2.70 | 0.15 | 0.0032 | 0.0015 | — | 6.08 | 0.68 | Comparative Example |
| 18 | 0.85 | 0.35 | 1.05 | 0.016 | 0.008 | 0.025 | 1.83 | 0.45 | 0.0039 | 0.0015 | — | 5.33 | 0.68 | Comparative Example |
| 19 | 0.85 | 0.30 | 1.05 | 0.016 | 0.008 | 0.025 | 1.83 | 0.15 | 0.0039 | 0.0015 | — | 4.33 | 1.00 | Comparative Example |
| 20 | 1.10 | 0.80 | 1.05 | 0.016 | 0.009 | 0.025 | 2.40 | 0.38 | 0.0034 | 0.0015 | — | 6.20 | 0.91 | Comparative Example |
| 21 | 0.91 | 0.35 | 1.05 | 0.016 | 0.008 | 0.025 | 2.00 | 0.23 | 0.0031 | 0.0015 | Ti: 0.01 | 5.17 | 1.00 | Comparative Example |
| 22 | 0.92 | 0.34 | 1.05 | 0.016 | 0.008 | 0.025 | 1.90 | 0.24 | 0.0035 | 0.0015 | Ni: 0.6, Cu: 0.6 | 5.17 | 1.00 | Comparative Example |
| 23 | 0.91 | 0.35 | 1.05 | 0.016 | 0.009 | 0.024 | 1.90 | 0.22 | 0.0033 | 0.0015 | B: 0.0010 | 5.16 | 1.00 | Comparative Example |
| 24 | 0.90 | 0.34 | 1.05 | 0.016 | 0.009 | 0.026 | 2.00 | 0.23 | 0.0038 | 0.0015 | Ti: 0.01, B: 0.0010 | 5.18 | 1.00 | Comparative Example |
| 25 | 0.92 | 0.34 | 1.98 | 0.016 | 0.008 | 0.025 | 2.01 | 0.22 | 0.0035 | 0.0014 | — | 5.17 | 0.99 | Comparative Example |

*1 $B_{10}$ Life Ratio $B_{10}$ Life/$B_{10}$ Life of Steel equivalent to JIS-SUJ2 (Steel Sample of No. 1)
*2 Tool Life Ratio: Tool Life/Tool Life of Steel equivalent to JIS-SUJ2

TABLE 2

| Steel Sample No. | \multicolumn{11}{c}{Chemical Composition (mass %)} | $B_{10}$ Life Ratio*1 | Tool Life Ratio*2 | Remarks |
|---|---|---|---|---|---|---|---|---|---|---|---|---|---|---|
| | C | Si | Mn | P | S | Al | Cr | Mo | N | O | Others | | | |
| 26 | 0.90 | 0.37 | 1.00 | 0.016 | 0.008 | 0.025 | 2.01 | 0.21 | 0.0030 | 0.0015 | Sb: 0.0021 | 6.50 | 1.00 | Inventive Example |
| 27 | 0.90 | 0.27 | 0.99 | 0.016 | 0.008 | 0.025 | 1.81 | 0.15 | 0.0035 | 0.0015 | Sb: 0.0020 | 1.42 | 0.99 | Comparative Example |
| 28 | 0.91 | 0.63 | 0.98 | 0.016 | 0.009 | 0.024 | 1.82 | 0.15 | 0.0034 | 0.0015 | Sb: 0.0022 | 6.35 | 0.97 | Inventive Example |
| 29 | 0.90 | 0.80 | 1.01 | 0.016 | 0.009 | 0.025 | 1.80 | 0.15 | 0.0039 | 0.0015 | Sb: 0.0020 | 6.35 | 0.94 | Inventive Example |
| 30 | 0.92 | 0.84 | 1.02 | 0.016 | 0.009 | 0.025 | 1.80 | 0.15 | 0.0039 | 0.0015 | Sb: 0.0020 | 6.48 | 0.75 | Comparative Example |
| 31 | 0.92 | 0.31 | 0.99 | 0.016 | 0.008 | 0.024 | 1.72 | 0.15 | 0.0039 | 0.0015 | Sb: 0.0021 | 1.69 | 1.00 | Comparative Example |
| 32 | 0.88 | 0.79 | 0.98 | 0.016 | 0.010 | 0.025 | 1.72 | 0.15 | 0.0031 | 0.0015 | Sb: 0.0019 | 1.87 | 0.97 | Comparative Example |
| 33 | 0.91 | 0.30 | 1.00 | 0.016 | 0.009 | 0.025 | 1.80 | 0.14 | 0.0034 | 0.0015 | Sb: 0.0021 | 1.20 | 1.00 | Comparative Example |
| 34 | 0.94 | 0.76 | 1.03 | 0.016 | 0.008 | 0.026 | 1.80 | 0.14 | 0.0034 | 0.0015 | Sb: 0.0021 | 1.23 | 1.00 | Comparative Example |
| 35 | 0.92 | 0.76 | 0.96 | 0.016 | 0.008 | 0.025 | 2.50 | 0.14 | 0.0035 | 0.0015 | Sb: 0.0020 | 2.00 | 0.95 | Comparative Example |
| 36 | 0.93 | 0.24 | 0.98 | 0.016 | 0.009 | 0.025 | 2.49 | 0.15 | 0.0035 | 0.0015 | Sb: 0.0021 | 1.58 | 0.99 | Comparative Example |
| 37 | 0.88 | 0.30 | 1.00 | 0.016 | 0.007 | 0.025 | 2.50 | 0.15 | 0.0039 | 0.0015 | Sb: 0.0022 | 6.38 | 0.98 | Inventive Example |
| 38 | 0.90 | 0.78 | 1.01 | 0.016 | 0.008 | 0.025 | 2.50 | 0.15 | 0.0035 | 0.0015 | Sb: 0.0019 | 6.65 | 0.92 | Inventive Example |
| 39 | 0.87 | 0.86 | 1.04 | 0.016 | 0.009 | 0.025 | 2.50 | 0.15 | 0.0033 | 0.0015 | Sb: 0.0018 | 6.65 | 0.70 | Comparative Example |
| 40 | 0.91 | 0.25 | 1.03 | 0.016 | 0.008 | 0.025 | 2.70 | 0.15 | 0.0031 | 0.0015 | Sb: 0.0023 | 1.85 | 0.78 | Comparative Example |
| 41 | 0.91 | 0.48 | 0.99 | 0.016 | 0.009 | 0.025 | 2.70 | 0.15 | 0.0032 | 0.0015 | Sb: 0.0021 | 6.68 | 0.68 | Comparative Example |
| 42 | 0.86 | 0.38 | 1.05 | 0.016 | 0.008 | 0.025 | 1.84 | 0.45 | 0.0039 | 0.0015 | Sb: 0.0021 | 6.70 | 0.68 | Comparative Example |
| 43 | 0.87 | 0.30 | 1.05 | 0.016 | 0.008 | 0.025 | 1.83 | 0.15 | 0.0031 | 0.0015 | Sb: 0.0020 | 6.45 | 1.00 | Inventive Example |
| 44 | 1.10 | 0.78 | 1.05 | 0.016 | 0.009 | 0.025 | 2.40 | 0.38 | 0.0034 | 0.0015 | Sb: 0.0021 | 6.74 | 0.91 | Inventive Example |
| 45 | 0.90 | 0.34 | 1.05 | 0.016 | 0.009 | 0.025 | 2.04 | 0.23 | 0.0039 | 0.0015 | Sb: 0.0020, Ti: 0.01 | 6.54 | 1.00 | Inventive Example |
| 46 | 0.90 | 0.35 | 1.05 | 0.016 | 0.008 | 0.025 | 1.95 | 0.24 | 0.0035 | 0.0015 | Sb: 0.0021, Ni: 0.5, Cu: 0.6 | 6.53 | 1.00 | Inventive Example |
| 47 | 0.90 | 0.35 | 1.05 | 0.016 | 0.009 | 0.024 | 1.94 | 0.22 | 0.0031 | 0.0015 | Sb: 0.0019, B: 0.0010 | 6.61 | 1.00 | Inventive Example |
| 48 | 0.91 | 0.34 | 1.05 | 0.016 | 0.008 | 0.026 | 2.00 | 0.23 | 0.0034 | 0.0015 | Sb: 0.0020, Ti: 0.01, B: 0.0010 | 6.58 | 1.00 | Inventive Example |
| 49 | 0.91 | 0.63 | 0.98 | 0.016 | 0.009 | 0.024 | 1.82 | 0.15 | 0.0034 | 0.0015 | Sb: 0.0016 | 6.33 | 0.97 | Inventive Example |
| 50 | 0.91 | 0.63 | 0.98 | 0.016 | 0.009 | 0.024 | 1.82 | 0.15 | 0.0034 | 0.0015 | Sb: 0.0050 | 6.45 | 0.97 | Inventive Example |
| 51 | 0.91 | 0.63 | 0.98 | 0.016 | 0.009 | 0.024 | 1.82 | 0.15 | 0.0034 | 0.0015 | Sb: 0.0013 | 5.20 | 0.97 | Comparative Example |
| 52 | 0.91 | 0.35 | 1.99 | 0.016 | 0.009 | 0.023 | 2.00 | 0.21 | 0.0037 | 0.0015 | Sb: 0.0022 | 6.57 | 0.99 | Inventive Example |

*1 $B_{10}$ Life Ratio: $B_{10}$ Life/$B_{10}$ Life of Steel equivalent to JIS-SUJ2 (Steel Sample of No. 1)
*2 Tool Life Ratio: Tool Life/Tool Life of Steel equivalent to JIS-SUJ2

As is apparent from Inventive Examples of Table 1 and Table 2, each steel satisfying the requirements of the present invention has the rolling contact fatigue life $B_{10}$ that is at least 6.33 times more as compared to Steel Sample of No. 1 (steel equivalent to JIS-SUJ2) as Conventional Example, and thus has an excellent hydrogen fatigue resistance property. Further, as is apparent from Inventive Examples of Table 1 and Table 2, each steel satisfying the requirements of the present invention has a tool life that is at least 0.91 times more as compared to Steel Sample of No. 1 (steel equivalent to JIS-SUJ2) as Conventional Example, and thus has machinability (workability) substantially equal to that of conventional steel.

In contrast, Comparative Examples having chemical compositions out of the range defined by the present invention were inferior to Inventive Examples either in rolling contact fatigue life $B_{10}$ or in tool life.

INDUSTRIAL APPLICABILITY

According to the present invention, the contents of Cr, Mo, and Si in the steel composition are particularly controlled to fall within proper ranges while Sb is further added by a proper amount, to thereby provide bearing steel that is significantly excellent in hydrogen fatigue resistance property as compared to conventional bearing steel, as well as being excellent in workability in, for example, cutting work. As a result, the rolling contact fatigue life of the bearing can be significantly increased, which brings numerous benefits to the industry.

The invention claimed is:

1. Bearing steel having a chemical composition containing, by mass %:

C: 0.85% to 1.10%;
Si: 0.30% to 0.80%;
Mn: 0.90% to 2.00%;
P: 0.025% or less;
S: 0.02% or less;
Al: 0.05% or less;
Cr: 1.8% to 2.5%;
Mo: 0.15% to 0.4%;
N: 0.0080% or less; and
O: 0.0020% or less,
wherein the chemical composition further contains, by mass %:
Sb: more than 0.0015% to 0.0050% or less,
with the balance being Fe and incidental impurities.

2. The bearing steel according to claim 1, wherein the chemical composition further contains, by mass %, at least one element selected from:

Ti: 0.01% or less;
Ni: 0.10% or less;
Cu: 0.10% or less; and
B: 0.0010% or less.

* * * * *